(12) United States Patent
Brown

(10) Patent No.: US 10,943,374 B2
(45) Date of Patent: Mar. 9, 2021

(54) RESHAPING OBJECTS ON A CANVAS IN A USER INTERFACE

(71) Applicant: Microsoft Technology Licensing, LLC, Redmond, WA (US)

(72) Inventor: Garrett William Brown, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/424,641

(22) Filed: Feb. 3, 2017

(65) Prior Publication Data

US 2018/0225848 A1 Aug. 9, 2018

(51) Int. Cl.
| | | |
|---|---|---|
| *G06T 11/20* | (2006.01) |
| *G06F 3/0488* | (2013.01) |
| *G06F 3/0354* | (2013.01) |
| *G06T 11/60* | (2006.01) |

(52) U.S. Cl.
CPC ........ *G06T 11/203* (2013.01); *G06F 3/03545* (2013.01); *G06F 3/04883* (2013.01); *G06T 11/60* (2013.01)

(58) Field of Classification Search
CPC combination set(s) only.
See application file for complete search history.

(56) References Cited

U.S. PATENT DOCUMENTS

| | | | |
|---|---|---|---|
| 6,536,972 B2 | 3/2003 | Bramlett et al. | |
| 6,587,587 B2 | 7/2003 | Rouiller et al. | |
| 7,190,375 B2 | 3/2007 | Dresevic et al. | |
| 7,424,154 B2 | 9/2008 | Seto et al. | |
| 7,526,128 B2 | 4/2009 | Koubaroulis et al. | |
| 8,154,544 B1* | 4/2012 | Cameron | G06T 19/20 345/419 |
| 8,300,062 B2* | 10/2012 | Tsang | G06F 3/04845 345/420 |
| 9,448,643 B2 | 9/2016 | Hicks | |
| 2003/0210817 A1 | 11/2003 | Hullender et al. | |
| 2004/0017375 A1 | 1/2004 | Lui et al. | |
| 2006/0007123 A1* | 1/2006 | Wilson | G06F 3/0425 345/156 |

(Continued)

OTHER PUBLICATIONS

Henzen, et al., "Sketching with a low-latency electronic ink drawing tablet", In Proceedings of the 3rd international conference on Computer graphics and interactive techniques in Australasia and South East Asia, Nov. 29, 2005, pp. 51-60.

(Continued)

*Primary Examiner* — Andrew G Yang

(57) ABSTRACT

Systems, methods, and software are disclosed herein for supporting an object reshaping feature in software applications. In an implementation, an application receives an input stroke on a canvas in a user interface to the application. The input stroke originates with an instrument-down action on the canvas, terminates with an instrument-up action on the canvas, and comprises a leading component. The application monitors for interactions to occur between the leading component of the input stroke and objects on the canvas during the input stroke. When an interaction occurs between the leading component and an object on the canvas, the application reshapes the object during the input stroke to reflect the interaction.

20 Claims, 9 Drawing Sheets

(56) References Cited

U.S. PATENT DOCUMENTS

| | | | |
|---|---|---|---|
| 2006/0262105 A1 | 11/2006 | Smith et al. | |
| 2008/0101682 A1* | 5/2008 | Blanford | G01B 11/005 382/141 |
| 2009/0193342 A1 | 7/2009 | Barthelmess et al. | |
| 2011/0164000 A1 | 7/2011 | Pance | |
| 2012/0092340 A1* | 4/2012 | Sarnoff | G06T 11/203 345/420 |
| 2013/0027404 A1* | 1/2013 | Sarnoff | G06T 1/20 345/441 |
| 2013/0127836 A1* | 5/2013 | Joshi | G06T 11/203 345/419 |
| 2013/0305172 A1* | 11/2013 | Joshi | G06F 3/0484 715/764 |
| 2013/0307861 A1* | 11/2013 | Lang | G06F 3/04845 345/582 |
| 2014/0009461 A1* | 1/2014 | Dai | G06F 3/04845 345/419 |
| 2014/0104189 A1* | 4/2014 | Marshall | G06F 3/0488 345/173 |
| 2014/0314302 A1* | 10/2014 | Minato | G06T 7/0004 382/141 |
| 2015/0227208 A1* | 8/2015 | Blevins | G06Q 30/0282 715/863 |
| 2015/0370468 A1* | 12/2015 | Kazi | H04L 67/10 715/211 |

OTHER PUBLICATIONS

Frisch, et al., "Diagram Editing on Interactive Displays Using Multi-touch and Pen Gestures", In Proceedings of 6th International Conference on Diagrammatic Representation and Inference, Aug. 9, 2010, 1 pages.

Saund, et al., "Stylus Input and Editing Without Prior Selection of Mode", In Proceedings of the 16th annual ACM symposium on User interface software and technology, Nov. 2, 2003, 4 pages.

* cited by examiner

RESHAPING OBJECTS ON A CANVAS IN A USER INTERFACE

TECHNICAL BACKGROUND

Many software applications provide drawing tools with which a user may create or edit shapes, lines, and other such objects. Once an object has been drawn, resizing the object can be done with ease, as opposed to reshaping the object, which can be something of a challenge. Some applications support selection handles, which allow a user to change an angle, deepen or flatten a curve, or otherwise reshape an object.

From a more technical perspective, selection handles require a given object on a canvas to be actively selected in a user interface. Once selected, handles may be surfaced at various points on the object with which the user may reshape the object. The user may be able to adjust the location of the handles on the object in some instances. Touching, clicking on, or otherwise interacting with another object or a blank space on the canvas deselects the object and thus removes the selection handles.

Unfortunately, the coarse adjustments made possible by selection handles often fail to achieve the desired result with sufficient accuracy and precision. In addition, interacting with the handles through a stylus or touch gesture can be an even less precise experience relative to using a mouse.

OVERVIEW

Technology is disclosed herein that allows end users to reshape objects on a canvas in a user interface to an application with ease using a stylus, mouse, touch gesture, or other such instruments. In an implementation, an application receives an input stroke on a canvas in a user interface to the application. The input stroke originates with an instrument-down action on the canvas, terminates with an instrument-up action on the canvas, and comprises a leading component. The application monitors for interactions to occur between the leading component of the input stroke and objects on the canvas during the input stroke. When an interaction occurs between the leading component and an object on the canvas, the application reshapes the object during the input stroke to reflect the interaction.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
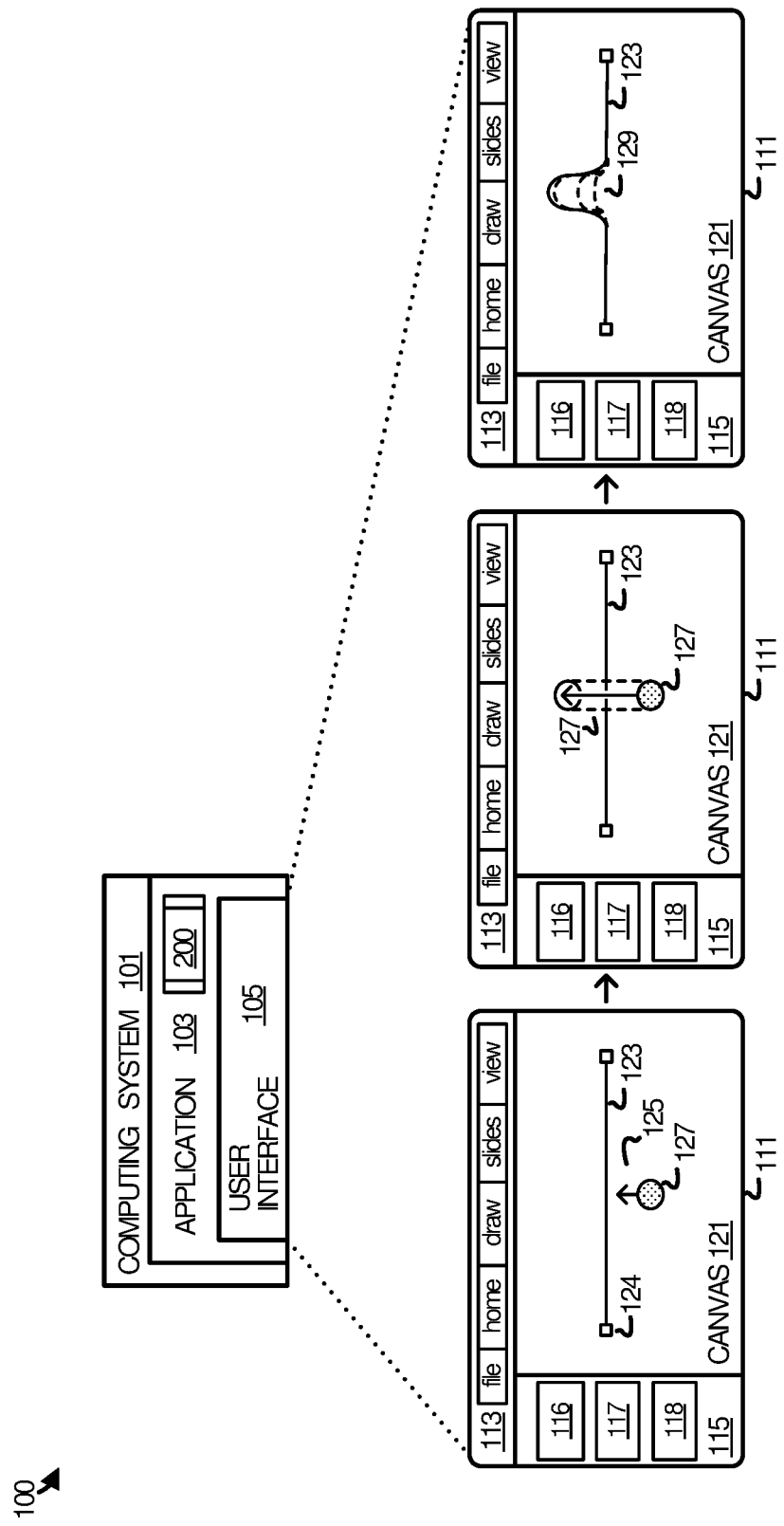
FIG. 1 illustrates an operational environment and a related operational scenario in an implementation of object reshaping.

Technology is disclosed herein that allows a user to reshape an object on a canvas with ease, rather than having to manipulate selection handles or other such tools. A user may interact with an application using a stylus, mouse, touch gestures, or other drawing instruments. In order to reshape a line, free-form line, a shape, or any other type of object, the user need only provide an input stroke with a drawing instrument in a manner that "pushes" the line into a new shape.

In an implementation, an input stroke may begin with an instrument-down action on a canvas and may end with an instrument action. In between the actions, the subject application monitors for the input stroke to interact with one or more objects on the canvas. The object(s) may be in a selected or unselected state. If the stroke interacts with an object, then at least a portion of the object is reshaped to reflect the interaction. In an example, an object may include various segments, at least one of which is encountered by the input stroke. The targeted segment would then be reshaped to reflect the interaction with the input stroke.

The segment may be a curve in some examples, in which case reshaping the segment may include deepening the curve. Other reshaping operations may include flattening a curve or introducing a depression to the curve. In fact, a curve could be flattened entirely, possibly re-shaping an object into a square or rectangle, for example. Reshaping in general may involve repositioning ink points on the canvas and/or adding ink points to an object in order to accomplish the deepening, flattening, or depression effects.

The tip of a stylus in some cases may be tracked on the canvas by a leading component. An input stroke may be considered to have interacted with an object when the leading component touches, bumps into, overlaps with, or otherwise traverses the object. The leading object may create touch points as it travels across a canvas. The location of the touch points can be compared to the location of object ink points in order to determine whether or not the input stroke has encountered an object on the canvas.

The object reshaping disclosed herein may be employed in place of, or in cooperation with, existing selection handles. In some implementations, one or more selection handles on an object may be repositioned on the object in response to the shape of the object changing due to an input stroke.

A technical effect that may be appreciated from the present discussion is the increased ease with which a user may now reshape objects on a canvas. Previous solutions involving selection handles required the user to first select an object and then manipulate the handles. However, the handles had to be placed appropriately on the object, otherwise the manipulation would lead to awkward results. The handles could be repositioned on the object, but only by user intervention, further increasing the time and effort required to change the contours of a line, shape, free-form drawing, or other such object.

The enhanced object reshaping disclosed herein allows a user to intuitively push or nudge a portion of an object into a more desirable position utilizing familiar input strokes. Indeed, a "push mode" is contemplated in some implementations whereby the state of an input instrument can be changed to allow for push interactions. The same comfortable strokes that would otherwise be used to draw an object can instead be used to reshape the object, thereby saving the user time, effort, and frustration.

In some implementations, the push mode may be entered into automatically in response to the user apply greater than a threshold amount of pressure with a stylus and moving the stylus at less than a threshold velocity. Such pressure and velocity may indicate to the application the user's intent to push around ink points on a canvas.

FIG. 1 illustrates operational environment 100 in an implementation of enhanced object reshaping. Operational environment 100 includes computing system 101 on which application 103 runs. Application 103 employs an object reshaping process 200 in the context of producing views in a user interface 105. View 111 is representative a view that may be produced by application 103 in user interface 105.

Figure 9:
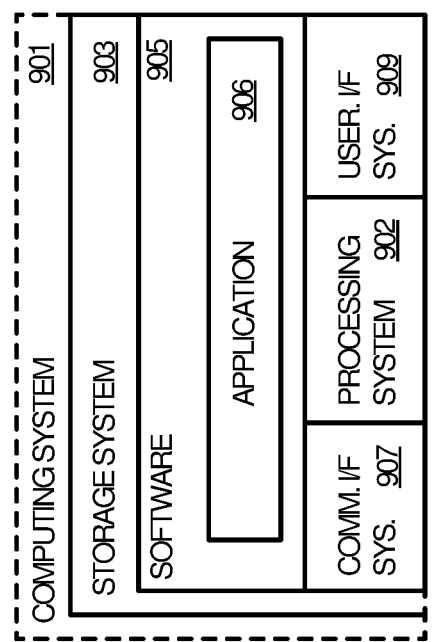
FIG. 9 illustrates a computing system suitable for implementing the software technology disclosed herein, including any of the applications, architectures, elements, processes, and operational scenarios and sequences illustrated in the Figures and discussed below in the Technical Disclosure.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for providing application 103. One such representative architecture is illustrated in FIG. 9 with respect to computing system 901.

Application 103 is representative of any software application or application component capable of reshaping objects in accordance with the processes described herein. Examples of application 103 include, but are not limited to, presentation applications, diagramming applications, computer-aided design applications, productivity applications (e.g. word processors or spreadsheet applications), and any other type of combination or variation thereof. Application 103 may be implemented as a natively installed and executed application, a web application hosted in the context of a browser, a streamed or streaming application, a mobile application, or any variation or combination thereof.

View 111 is representative of a view that may be produced by a presentation application, such as PowerPoint® from Microsoft®, although the dynamics illustrated in FIG. 1 with respect to view 111 may apply to any other suitable application. View 111 includes various elements for accessing the features and functionality of application 103, such as menu 113 and side panel 115. Other elements in place of or in addition to those included in view 111 are possible and may be considered within the scope of the present disclosure.

Menu 113 includes various elements for navigating to sub-menus of the application (e.g. file, home, draw, slides, and view). A user may select a given element to navigate to features of the application, such as file-system features, basic features, drawing features, slide features, and view options. View 111 also includes a side panel 115 that may provide previews of slides produces using the application.

An end user may interface with application 103 to produce flow charts, diagrams, basic layout drawings, or any other type of presentation on canvas 121. The user may deposit shapes, draw free-form lines, or otherwise create objects on canvas 121 in furtherance of a given presentation. The objects may be editable in that their length, width, height, or other characteristics may be changed by simple direct manipulation of an object. In a simple example, a user may select and drag one end of a straight line to lengthen it. In another example, the user may select and drag a selection point on a shape to expand it in one direction or another. Other familiar features may include the ability to rotate an object, squeeze an object, and to move an object around a canvas.

In an enhancement, application 103 provides the ability to reshape an object by way of input strokes on the canvas, rather than having to reshape it by manipulating selection handles. In some implementations, the object may be selected, while in others it need not be selected. In still others, one or more objects are concurrently selected on the canvas.

Referring to the scenario illustrated in view 111, an object 123 may be drawn on canvas 121. While object 123 in this example is a straight line, the object may be a curved line, a free form line, a shape, a free form shape, or any other type of object capable of being reshaped. Object 123 is shown in a selected state with selection handles 124 surfaced at each end for illustrative purposes, although it need not be selected.

An input stroke 125 may be supplied through user interface 105 by way of a stylus, a mouse input, a touch gesture, or some other instrument. The input stroke originates with an instrument-down action on canvas 121. The instrument-down action may be, for example, when the drawing instrument touches a surface of computing system 101, which through various hardware and software elements is translated into a touch point on canvas 121. The input stroke proceeds until an instrument-up action occurs. The instrument-up action may be, for example, when the drawing instrument lifts up from the surface of computing system 101, thereby translating to a loss of contact with canvas 121. The input stroke takes a straight vertical path in this example, but may curve, wind around, or take any other user-defined path on canvas 121. Multiple input strokes are also possible.

The input stroke 125 includes a leading component 127 that defines an area on canvas 121 that follows the path of the input stroke. The leading component itself has a leading edge that intersects, overlaps with, or otherwise interacts with other objects already present on canvas 121. In an example involving a stylus, the leading component may be an area around the tip of the stylus where the stylus makes contact with the canvas. In an example involving a touch gesture, the leading component may be the area around where the touch gesture makes contact with the canvas. The leading component may be expanded or contracted dynamically in some scenarios. In some cases, the leading component may be as narrow as the tip of a stylus or broader in order to provide a thicker input stroke.

The input stroke in this scenario travels up through object 123, causing a segment of object 123 to be reshaped. Namely, object 123 is extended upward into a curve. In other words, the segment is "pushed" up by the input stroke 125. Such a feature may be referred to as a "push pen" in some implementations.

While only a single object is illustrated in this scenario, it may be appreciated the more than one object may be present on canvas 121. In such a case, the input stroke may encounter more than one object. In some scenarios, the encounter between the input stroke and a second object could be ignored. In the scenario described above, the target object may be stretched to a point where it overlaps with the second object. In other scenarios, the both objects could be changed in response to a single input stroke. Referencing the scenario described above again, both objects could be reshaped.

Figure 2:
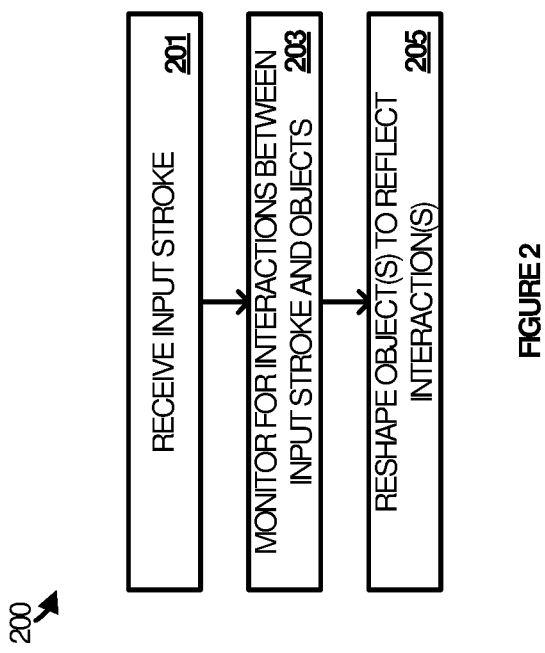
FIG. 2 illustrates an object reshaping process in an implementation.

More particularly, FIG. 2 illustrates object reshaping process 200 which, as mentioned, may be employed by application 103 to allow objects to be reshaped as described herein. Some or all of the steps of object reshaping process 200 may be implemented in program instructions in the context of a component or components of the application used to carry out the object reshaping. The program instructions direct application 103 to operate as follows, referring parenthetically to the steps in FIG. 2.

In operation, application 103 receives an input stroke through user interface 105 (step 201). The input stroke may be made with a stylus device, a touch gesture, mouse input, or any other suitable instrument. The input stroke begins with an instrument-down action when the user places a drawing instrument on canvas 121. A single drawing action moves the drawing instrument across the canvas along a user-defined path until an instrument-up action is received. The input stroke may be one of a series of strokes that may be interpreted together or may be a single event that may be interpreted alone.

While the input stroke progresses from the instrument-down action to the instrument-up action, the application 103 monitors for any interactions between the input stroke and an object or objects on canvas 121 (step 203). If a particular object on the canvas 121 is in a selected state, then the application may monitor for interactions with just that object. If multiple objects are in a selected state, then the application may monitor for interactions with the multiple objects. If no objects are in a selected state, then the application may monitor for interactions with any object on the canvas. In other words, the application may be capable of monitoring for interactions with objects on the canvas regardless of whether an object is selected or not.

An example of an interaction may be, for example, when the path of an input stroke meets an object on the canvas 121. When an interaction occurs, the shape of the subject object is changed to reflect the interaction (step 205). Reshaping the object may involve changing the shape of a segment of the object. In an example, the curve of a line may be altered. In another example, a line segment of a shape may be altered. Altering a line, segment, or other component of an object may include deepening a curve, flattening a curve, introducing a depression to a curve, or the like.

Figure 3:
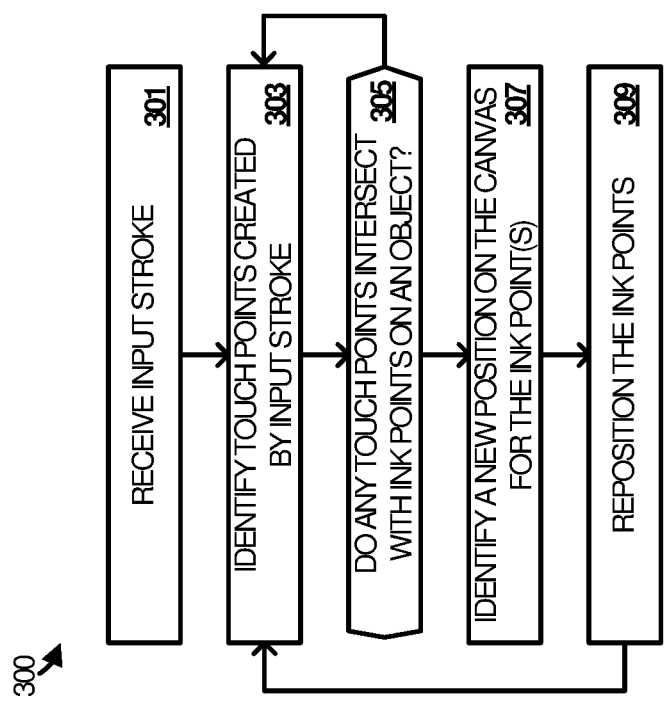
FIG. 3 illustrates another object reshaping process in an implementation.

FIG. 3 illustrates another object reshaping process 300 that may be employed by application 103. Object reshaping process 300 may be employed in cooperation with object reshaping process 200 in some implementations. In other implementations, some or all of the steps in object reshaping process 300 may be integrated with those of object reshaping process 200. Some or all of the steps of object reshaping process 300 may be implemented in program instructions in the context of the component or components of application 103. The program instructions direct application 103 to operate as follows, referring parenthetically to the steps in FIG. 3.

In operation, application 103 receives an input stroke through user interface 105 (step 301). As mentioned, the input stroke may be delivered via a stylus device, a touch gesture, a mouse input, or the like. The input stroke creates touch points on canvas 121 as it traverses the surface of computing system 101. The touch points are identified to application 103 (step 303) and may be analyzed to determine if any of them intersect with an object on canvas 121 (step 305). Each object may itself include various ink points that in the aggregate provide the visual realization of the object on canvas 121. Both the ink points and the touch points may be defined in terms of coordinates on canvas 121, thereby allowing their respective positions to be compared.

The position of the touch points may be compared to the position of the ink points as the input stroke progresses from an instrument-down action through to an instrument-up action. As the input stroke may include a leading component, the touch points may be defined in terms of the points on canvas 121 that are covered by the leading component as it travels across the canvas 121. The input stroke may be considered in terms of discrete time slices, discrete chunks of touch points, discrete distances traveled, or some other metric that may drive application 103 to check for object ink points.

If no ink point is encountered for a given cycle, then the application 103 continues to monitor for interactions until the input stroke is complete. However, if an ink point or points is encountered by the input stroke, then a new position for the ink point(s) on the canvas 121 is determined (step 307). The new position may be derived from the position on the canvas 121 where the instrument-up action occurs. In some cases, the new position may be precisely where the instrument-up action occurs, while in other cases the new position may simply bear some relation to the location of the instrument-up action. Once a new position is determined for an ink point, it may be repositioned on the canvas 121 to the new position. As multiple input strokes occur in the aggregate, multiple ink points are repositioned, thereby serving to reshape the object in a precise, user-friendly manner.

Figure 4:
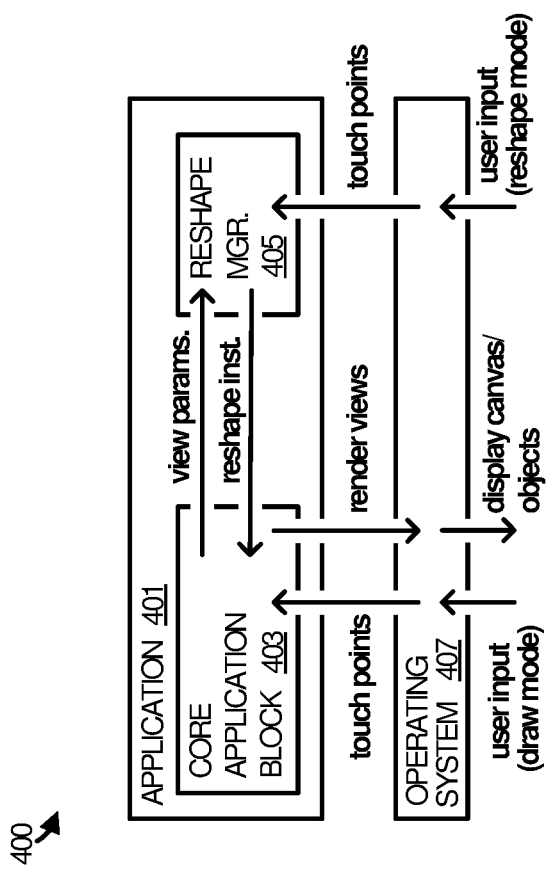
FIG. 4 illustrates a software architecture in an implementation.

FIG. 4 illustrates a software architecture 400 for providing an enhanced object reshaping feature in an implementation. Software architecture 400 includes application 401 and operating system 407. Application 401 includes core application block 403 and reshape manager 405.

Application 401 is representative of any software application or application component that may provide an object reshaping feature as described herein. Application 401 may be a natively installed and executed application, a browser-based application executed in the context of a web browser, a mobile application, a streamed or streaming application, or any combination or variation thereof. Operating system 407 is representative of any operating system that may run on a suitable computing device (physical or virtual). Examples include desktop operating systems, mobile operating system, proprietary operating systems, open source operating systems, and any other combination or variation thereof.

Core application block 403 is representative of the code base that governs the operation of application 401. Core application block 403 handles the main logic of application 401 and the overall user experience. Core application block 403 may include many components, modules, or other collections of program instructions that cooperate to provide the user experience. The components of core application block 403 may run on the main thread of the application, for example.

Reshape manager 405 is representative of one or more components that function to provide enhanced object reshaping. Reshape manager 405 may be launched by core application block 403 when application 401 is placed into a "reshape" mode by a user selection. The reshape mode allows user input to be interpreted differently than when the application 401 is operating in a draw mode (or some other mode).

In particular, the reshape mode allows input strokes to be interpreted in reshape terms, whereas input strokes supplied in a draw mode would be interpreted as drawing strokes. Drawing strokes may result in ink points being laid down on a drawing canvas, for example, whereas an input stroke in the reshape mode would not.

In a highly simplified example, user input is supplied to operating system 407 through various hardware and software components of the underlying computing device (e.g. computing system 901). When operating in a normal mode (or draw mode), operating system 407 translates the user input into touch points which may be communicated to core application block 403 or some other component of application 401. Core application block 403 receives the touch points and determines what to render in an application view. As an example, a user may drag a stylus across a display screen, which the operating system 407 translates into touch points. Application 401 determines that a line has been drawn and returns a view to operating system 407 that includes the ink points for the line. Operating system 407 may then display the view on the display screen of the computing device.

If application 401 is running in reshape mode (e.g. if a user has selected a "push mode" for his or her drawing stylus), then the touch points identified by the operating system 407 may be communicated to reshape manager 405. Operating system 407 may communicate directly with reshape manager 405, although in some implementations, operating system 407 may communicate with reshape manager 405 through core application block 403. Reshape manager 405 determines whether or not the touch points intersect with any ink points belonging to objects already drawn on the canvas. Reshape manager 405 may make the determination using view parameters provided to it by core application block 403, such as the position or coordinates of ink points. However, reshape manager 405 may also obtain such information from operation system 407 or other application components.

If an ink point is implicated, then reshape manager 405 may instruct core application block 403 to redraw the object so as to reflect the user input. Alternatively, reshape manager 405 may be capable of redrawing the object or a segment of the object itself. The re-drawn object is provided to operating system 407 to be displayed on the display screen of the device.

Figure 5:
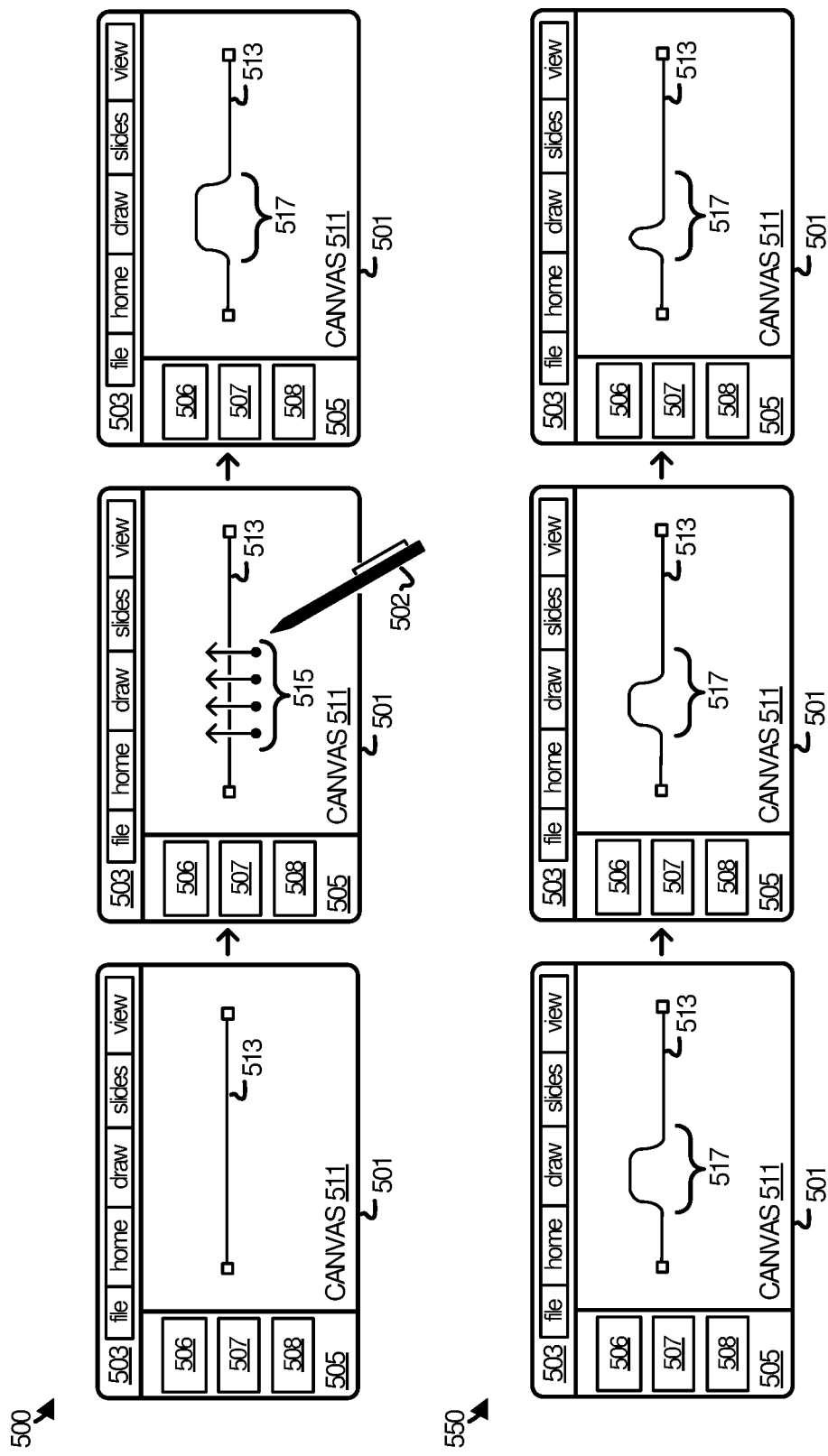
FIG. 5 illustrates various operational scenarios in an implementation.

FIG. 5 illustrates an operational scenario 500 in an implementation to better demonstrate some practical effects of the enhanced object reshaping disclosed herein. Operational scenario 500 relates to a view 501 that may be produced by an application, e.g. application 103 or application 401. View 501 is representative of a view that may be rendered in the context of a user interface to a presentation application. However, it may be appreciated that the dynamics illustrated in operational scenario 500 may apply as well to other views produced by other applications, such as diagramming applications, design applications, word processing application, spreadsheet application, or any other type of application that may employ object reshaping features.

View 501 includes a feature menu 503 that provides various elements for navigating to useful sub-menus (e.g. file, home, draw, slides, and view). A side panel 505 provides thumbnail previews 506, 507, and 508 of other slides in a presentation document. An end-user may interact on a canvas 511 to create a flow chart, drawing, or other such content for a presentation slide.

In operation, the application that produces view 501 employs an object reshaping process, such as object reshaping process 200 and/or 300. At the outset, the user has drawn line 513, although other objects are possible, such as a shape or an image. Line 513 is shown in a selected state, although it may be in an unselected state as well.

The user interfaces with canvas 511 using a stylus 502. Stylus 502 is representative of a digital pen that may communicate with the underlying computing device that supports view 501 to allow the user to draw using digital ink and other tools. In this scenario, the user proceeds to sketch four short, vertical strokes, represented by input strokes 515. The input strokes 515 are received by the application operating in a push mode. The application analyzes the inputs strokes to determine whether they intersect with any ink points belonging to any objects on canvas 511. In this case, the input strokes 515 bumped into the ink points belonging to line 513. Accordingly, a segment 517 of line 513 is reshaped by moving the subject ink points to a position near the end of the input strokes.

In this manner, the user may "push" a portion of line 513 from its original position to a new position, without having to utilize selection handles. The short strokes provide a more intuitive and precise experience for the user.

Operational scenario 550 illustrates an undo scenario that allows the user to undo one or more of the input strokes 515 illustrated in operational scenario 500. Each of the input strokes 515 in operational scenario 500 may be recorded as an individual event. Each input stroke may thus be undone individually. Accordingly, by pressing an undo button or key combination, the user can walk-back the object reshaping on a per-stroke basis.

Figure 6:
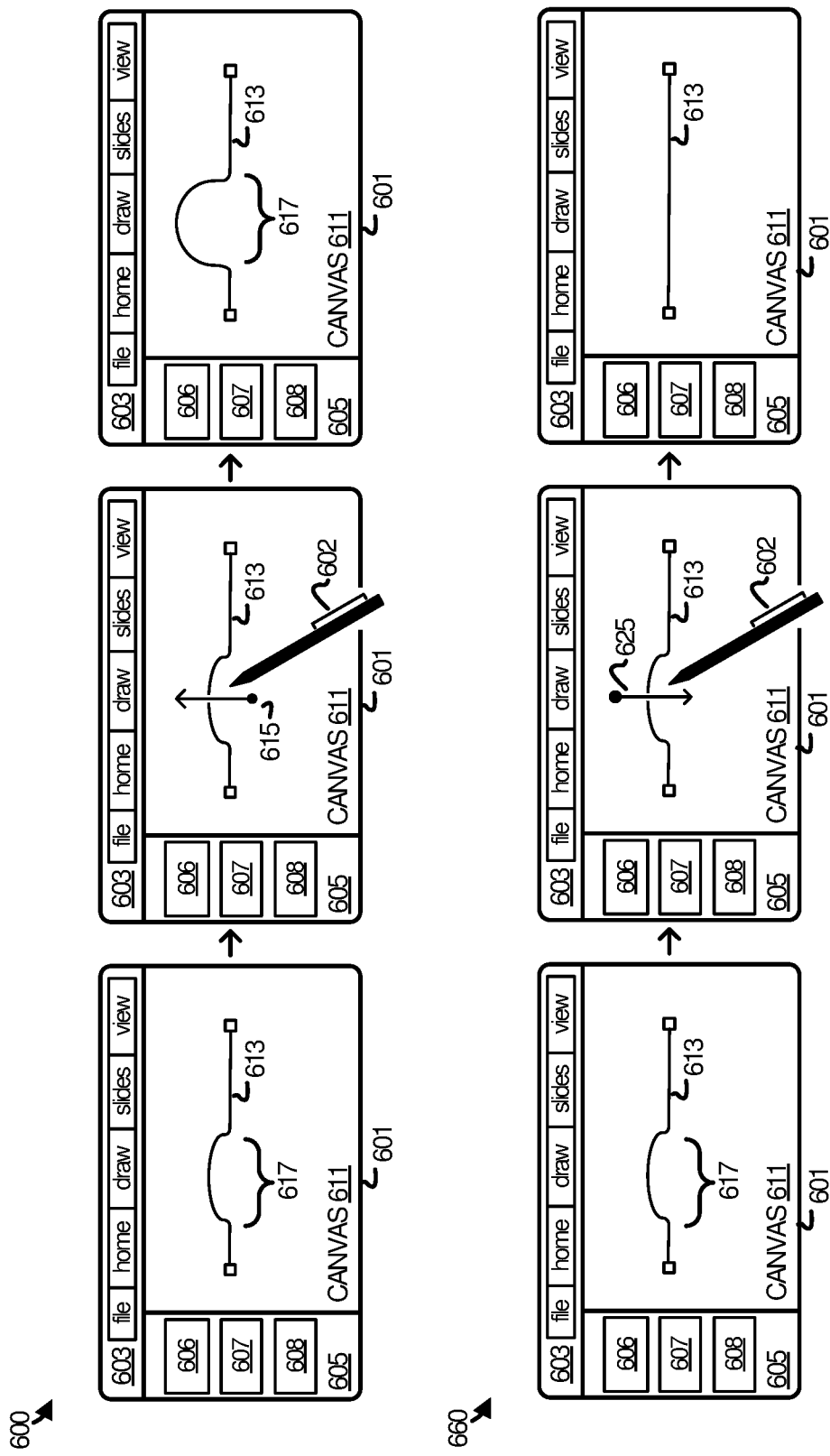
FIG. 6 illustrates various operational scenarios in an implementation.

FIG. 6 illustrates an operational scenario 600 in another implementation of the enhanced object reshaping disclosed herein. Operational scenario 600 relates to a view 601 that may be produced by an application, e.g. application 103 or application 401. View 601 is again representative of a view that may be rendered in the context of a user interface to a presentation application, although other applications are possible, as with operational scenario 500 in FIG. 5.

View 601 includes feature menu 603 that provides various elements for navigating to useful sub-menus (e.g. file, home, draw, slides, and view). Side panel 605 provides thumbnail previews 606, 607, and 608 of other slides in a presentation document. An end-user may interact on a canvas 611 to create a flow chart, drawing, or other such content for a presentation slide.

In operation, the application that produces view 601 employs an object reshaping process, such as object reshaping process 200 and/or 300. At the outset, the user has drawn line 613, although other objects are possible. Line 613 includes a curve that arcs upward. Line 613 is shown in a selected state, although it may be unselected as well.

The user interfaces with canvas 611 using stylus 602. In this scenario, the user proceeds to sketch an input stroke 615 which travels vertically through line 613, although a series of strokes may be possible. The input stroke 615 is received by the application operating in a push mode. The application analyzes the inputs stroke to determine whether it intersects with any ink points belonging to any objects on canvas 611. In this case, input stroke 615 encountered the ink points belonging to line 613, and in particular, the ink points associated with the curve on the line. Accordingly, a segment 617 of line 613 is reshaped by moving the subject ink points to a position near the end of the input strokes having an effect of deepening the curve of line 613. The user is able to push a portion of line 613 upward to deepen the curve that was initially present.

FIG. 6 also illustrates operational scenario 660. Operational scenario 660 is similar to operational scenario 600, except that an input stroke 625 is received that originates from a different direction than input stroke 615. In operational scenario 660, input stroke 625 originates above the curve of the line 613 and proceeds in a downward direction. The input stroke 625 encounters the ink points belonging to segment 617 and results in a repositioning of the ink points such that the curve is flattened. Thus, the user is able to simply push down the curve of the line so that the line is flat or at the least has less of a curvature.

Figure 7:
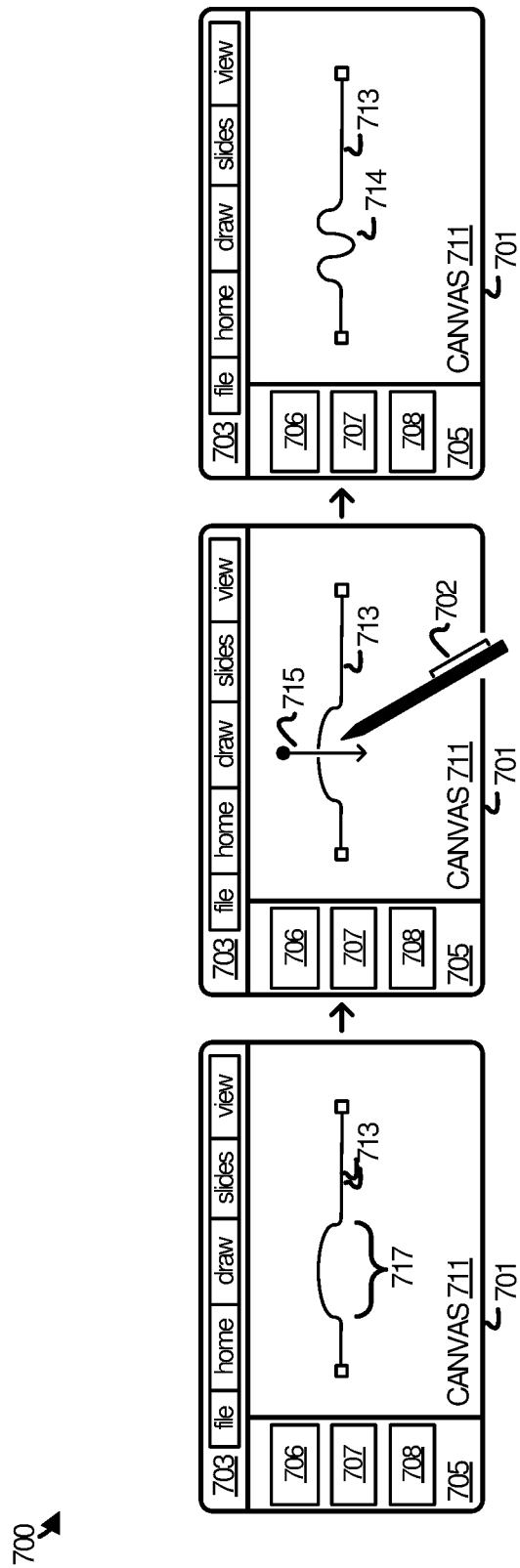
FIG. 7 illustrates an operational scenario in an implementation.

FIG. 7 illustrates an operational scenario 700 in an implementation of the enhanced object reshaping disclosed herein. Operational scenario 700 relates to a view 701 that may be produced by an application, e.g. application 103 or application 401. View 701 is also representative of a view that may be rendered in the context of a user interface to a presentation application, although other applications are possible, as with operational scenario 500 in FIG. 5.

View 701 includes feature menu 703 that provides various elements for navigating to useful sub-menus. Side panel 705 provides thumbnail previews 706, 707, and 708 of other slides in a presentation document. An end-user may interact on a canvas 711 to create a flow chart, drawing, or other such content for a presentation slide.

In operation, the application that produces view 701 employs an object reshaping process, such as object reshaping process 200 and/or 300. At the outset, the user has drawn line 713, although other objects are possible. Line 713 includes a curve that arcs upward. Line 713 is shown in a selected state, although it may be unselected as well.

The user interfaces with canvas 711 using stylus 702. In this scenario, the user proceeds to sketch one input stroke 715 which travels vertically in a downward direction through the segment 717 (curved) of line 713, although a series of strokes may be possible. The input stroke 715 is received by the application operating in a push mode. The application analyzes the inputs stroke to determine whether it intersects with any ink points belonging to any objects on canvas 711. In this case, input stroke 715 encountered the ink points belonging to line 713, and in particular, the ink points associated with the curve on the line. Accordingly, segment 717 is reshaped by moving the subject ink points to a position near the end of the input strokes having an effect of introducing a depression 714 in the curve. The user is able to push a portion of line 713 downward to introduce the depression.

Figure 8:
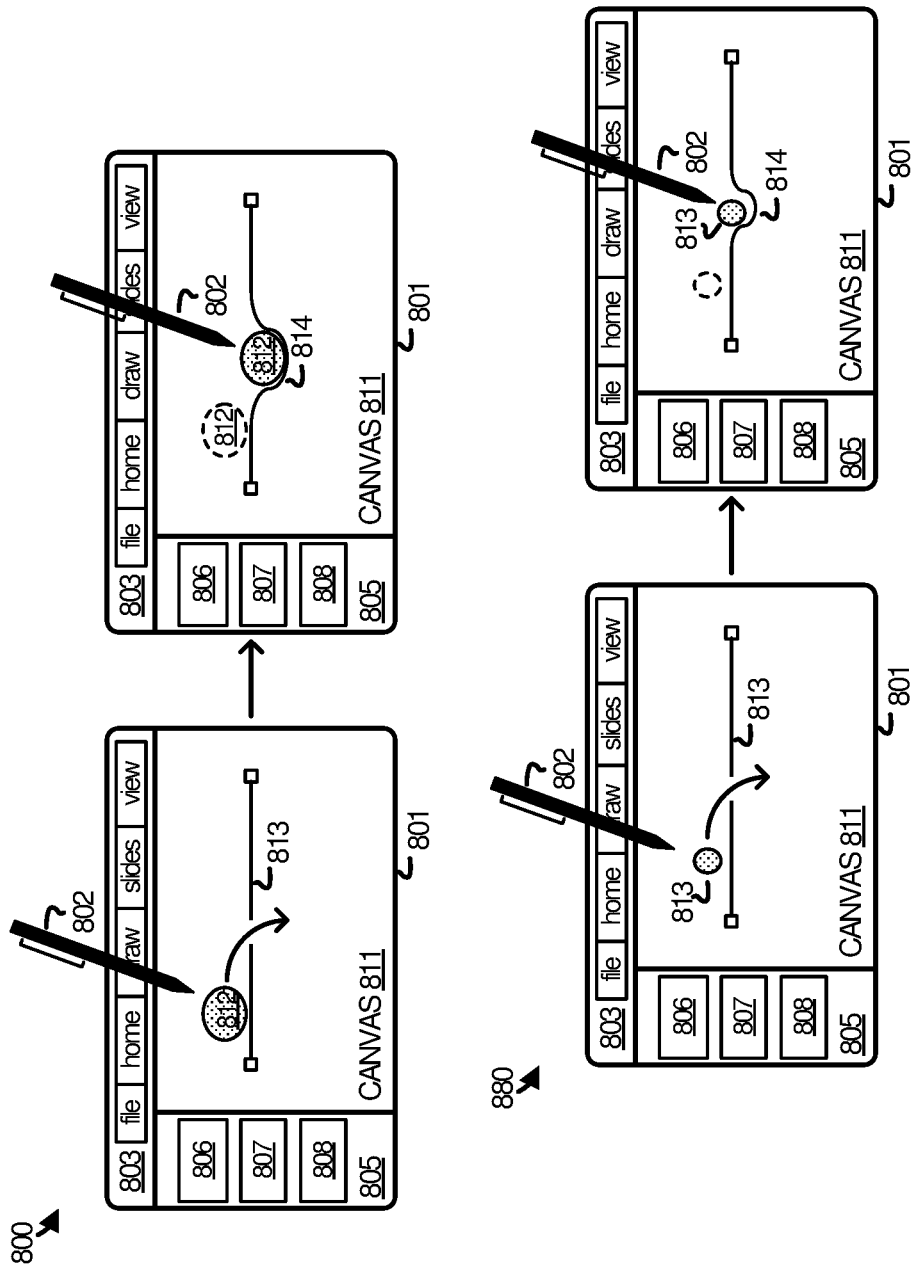
FIG. 8 illustrates an operational scenario in an implementation.

FIG. 8 illustrates operational scenario 800 and operational scenario 880 in an implementation to demonstrate the effect of changing the relative size of a leading component. Both scenarios involve a view 801 produced by an application, such as application 103 or application 401. View 801 includes a feature menu 803 that includes various sub-menus. View 801 also includes a side panel 805 that includes various thumbnail previews of slides or other such content that may be produced using the application. The thumbnail previews are represented by thumbnail preview 806, thumbnail preview 807, and thumbnail preview 808.

In operation, a user employs a stylus 802 to draw on canvas 811. In this example, the user has drawn line 813, although other shapes are possible. Line 813 is shown in a selected state, although it could be in an unselected state. Stylus 802 is initially set to have a leading component 812 of a certain size. The user can press the stylus 802 to the display of the underlying computing device in order to draw objects on canvas 811 and to perform object reshaping operations as described herein.

In this example, the user moves stylus 802 along the canvas in a downward arc. The downward arc brings leading component 812 into contact with the ink points belonging to line 813, causing the ink points to be displaced or repositioned, which results in a depression 814 in the line 813. Indeed, this may be the effect intended by the user. The size or depth of the depression corresponds to the size of the leading component 812.

In operational scenario 880, the user employs a different size for leading component 812 relative to that in operational scenario 800. Accordingly, the displacement of ink points caused by the downward arc is less than that in operational scenario 800. For example, the depression formed in line 813 is smaller relative to the depression formed by the larger size of the leading component in operational scenario 800.

FIG. 9 illustrates computing system 901, which is representative of any system or collection of systems in which the various applications, services, scenarios, and processes disclosed herein may be implemented. Examples of computing system 901 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the object reshaping operations described herein. Such systems may employ one or more virtual machines, containers, or any other type of virtual computing resource in the context of object reshaping.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes application 906 which is representative of the software applications discussed with respect to the preceding FIGS. 1-8, including application 103 and application 401. When executed by processing system 902 to support object reshaping in a user interface, application 906 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 in general, and application 906 in particular, may be implemented in program instructions and among other functions may, when executed by processing system 902, direct processing system 902 to operate as described with respect to the various operational scenarios, sequences, and processes illustrated herein. For example, application 906 may include program instructions for implementing an object reshaping process, such as object reshaping processes 200 and 300.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include application 906. Software 905 may also comprise firmware or some other form of machine-readable processing instructions executable by processing system 902.

In general, application 906 may, when loaded into processing system 902 and executed, transform a suitable apparatus, system, or device (of which computing system 901 is representative) overall from a general-purpose computing system into a special-purpose computing system customized to perform object reshaping operations. Indeed, encoding application 906 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, application 906 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g. user interface 105).

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
one or more computer readable storage media;
a processing system operatively coupled with the one or more computer readable storage media; and
program instructions stored on the one or more computer readable storage media for supporting an object reshaping feature in an application that, when executed by the processing system, direct the processing system to at least:
while in a reshape mode, receive a continuous input stroke made with a digital stylus on a canvas in a user interface to the application, wherein the continuous input stroke originates with an instrument-down action on a blank space on the canvas, terminates with an instrument-up action on the canvas, and comprises a leading component, which comprises a leading edge;
during the continuous input stroke, monitor for the leading edge of the leading component to intersect with a segment of one or more drawn objects drawn on the canvas while in a draw mode; and
in response to an intersection of the leading edge of the leading component with the one or more drawn objects on the canvas, deform the one or more drawn objects during the continuous input stroke by pushing the segment of the one or more drawn objects to a position along the leading edge.

2. The computing apparatus of claim 1 wherein to deform the one or more drawn objects during the continuous input stroke, the program instructions direct the processing system to deform the segment of the one or more drawn objects that was touched by the continuous input stroke based on a size of the leading edge of the leading component.

3. The computing apparatus of claim 1 wherein the segment of the one or more drawn objects comprises a curve and wherein to deform the segment of the one or more drawn objects, the program instructions direct the processing system to at least deepen the curve or flatten the curve.

4. The computing apparatus of claim 1 wherein the segment of the one or more drawn objects comprises a curve and wherein to deform the segment of the one or more drawn objects, the program instructions direct the processing system to introduce at least a depression in the curve or a curve to a straight line.

5. The computing apparatus of claim 1 wherein the application comprises a core application block and a reshape manager and wherein to monitor for the leading edge of the of the leading component to intersect with the segment of the one or more drawn objects drawn on the canvas and deform the one or more drawn objects during the continuous input stroke, the program instructions direct the processing system to:
in the core application block, determine that the draw mode is selected, translate received touch points into ink points, and render the segment of the one or more drawn objects on the canvas based on the ink points;
in the reshape manager, determine that the reshape mode is selected, identify additional received touch points that intersect with the ink points of the segment of the one or more drawn objects on the canvas, and generate reshape instructions indicating repositioned ink points of the segment of the one or more drawn objects; and
in the core application block, receive the reshape instructions from the reshape manager and in response, render the segment of the one or more drawn objects on the canvas based on the repositioned ink points.

6. The computing apparatus of claim 5 wherein the reshape mode comprises a push mode.

7. The computing apparatus of claim 1 wherein the leading component comprises an area on the canvas that tracks a tip of a stylus that supplies the continuous input stroke and wherein the one or more drawn objects comprises a free-form line hand-drawn with the stylus.

8. The computing apparatus of claim 1 wherein the program instructions further direct the processing system to reposition at least a selection handle on the one or more drawn objects in response to the instrument-up action.

9. A method of operating an application on a computing apparatus in support of an object reshaping feature in the application, the method comprising:
while in a reshape mode, receiving a continuous input stroke made with a digital stylus on a canvas in a user interface to the application, wherein the continuous input stroke originates with an instrument-down action on a blank space on the canvas, terminates with an instrument-up action on the canvas, and comprises a leading component, which comprises a leading edge;
during the continuous input stroke, monitoring for the leading edge of the leading component to intersect with a segment of one or more drawn objects drawn on the canvas while in a draw mode; and
in response to an intersection of the leading edge of the leading component with the one or more drawn objects on the canvas, deforming the one or more drawn objects during the continuous input stroke by pushing the segment of the one or more drawn objects to a position along the leading edge.

10. The method of claim 9 wherein deforming the one or more drawn objects during the continuous input stroke comprises deforming the segment of the one or more drawn objects that was touched by the continuous input stroke based on a size of the leading edge of the leading component.

11. The method of claim 9 wherein the segment of the one or more drawn objects comprises a curve and wherein deforming the segment of the one or more drawn objects comprises at least deepening the curve or flattening the curve.

12. The method of claim 9 wherein the segment of the one or more drawn objects comprises a curve and wherein deforming the segment of the one or more drawn objects comprises introducing at least a depression in the curve or a curve to a straight line.

13. The method of claim 9 wherein the application comprises a core application block and a reshape manager and wherein monitoring for the leading edge of the of the leading component to intersect with the segment of the one or more drawn objects drawn on the canvas and deforming the one or more drawn objects during the continuous input stroke comprises:
- in the core application block, determining that the draw mode is selected, translating received touch points into ink points, and rendering the segment of the one or more drawn objects on the canvas based on the ink points;
- in the reshape manager, determining that the reshape mode is selected, identifying additional received touch points that intersect with the ink points of the segment of the one or more drawn objects on the canvas, and generating reshape instructions indicating repositioned ink points of the segment of the one or more drawn objects; and
- in the core application block, receiving the reshape instructions from the reshape manager and in response, rendering the segment of the one or more drawn objects on the canvas based on the repositioned ink points.

14. The method of claim 13 wherein the reshape mode comprises a push mode.

15. The method of claim 9 wherein the leading component comprises an area on the canvas that tracks a tip of a stylus that supplies the continuous input stroke and wherein the one or more drawn objects comprises a free-form line hand-drawn with the stylus.

16. The method of claim 9 further comprising repositioning at least a selection handle on the one or more drawn objects in response to the instrument-up action.

17. One or more computer readable storage media having program instructions stored thereon for supporting an object reshaping feature in an application that, when executed by a processing system, direct the processing system to at least:
- while in a reshape mode, receive a continuous input stroke made with a digital stylus on a canvas in a user interface to the application, wherein the continuous input stroke originates with an instrument-down action on a blank space on the canvas, terminates with an instrument-up action on the canvas, and comprises a leading component, which comprises a leading edge;
- during the continuous input stroke, monitor for the leading edge of the leading component to intersect with a segment of one or more drawn objects drawn on the canvas while in a draw mode; and
- in response to an intersection of the leading edge of the leading component with the one or more drawn objects on the canvas, deform the one or more drawn objects during the continuous input stroke by pushing the segment of the one or more drawn objects to a position along the leading edge.

18. The one or more computer readable storage media of claim 17 wherein to deform the one or more drawn objects during the continuous input stroke, the program instructions direct the processing system to deform the segment of the one or more drawn objects that was touched by the continuous input stroke based on a size of the leading edge of the leading component.

19. The one or more computer readable storage media of claim 17 wherein the segment of the one or more drawn objects comprises a curve and wherein to deform the segment of the one or more drawn objects, the program instructions direct the processing system to deepen the curve, flatten the curve, or introduce a depression in the curve.

20. The one or more computer readable storage media of claim 17 wherein the leading component comprises an area on the canvas that tracks a tip of a stylus that supplies the continuous input stroke and wherein the one or more drawn objects comprises a free-form line hand-drawn with the stylus.

* * * * *